Sept. 2, 1930.  W. J. FIEGEL ET AL  1,774,794
BABBITTING MACHINE
Filed Dec. 19, 1927  6 Sheets-Sheet 2

Fig. 2.

Inventors
William J. Fiegel
Winfield S. Enderich

Attorneys

Patented Sept. 2, 1930

1,774,794

UNITED STATES PATENT OFFICE

WILLIAM J. FIEGEL AND WINFIELD S. ENDERICH, OF DETROIT, MICHIGAN, ASSIGNORS TO BOHN ALUMINUM AND BRASS CORPORATION, OF DETROIT, MICHIGAN, A COPORATION OF MICHIGAN

BABBITTING MACHINE

Application filed December 19, 1927. Serial No. 241,143.

This invention relates to a babbitting machine and has particular reference to a machine for centrifugally lining the interiors of connecting rods and bearings with babbitt.

An object of this invention is to provide a babbitting machine having a motor movable to driving and idle positions and having means for moving the said motor to either of these positions.

A further object of this invention is to provide a babbitting machine having a rotatable head, a motor for driving the head and means whereby upon disconnection of the motor from the head a braking force will be applied to the head.

Another object of this invention is to provide a babbitting machine having means for clamping a piece of work and having means for compensating for slight variations in the size of the articles clamped.

A still further object of this invention is to provide a babbitting machine having a head movable to a work clamping position and having means for wedging the said head in its work clamping position.

Still another object of this invention is to provide a babbitting machine having a head movable into and out of work clamping positions and having means preventing rotation of the head when the same is out of work clamping position.

Other objects and advantages of this invention will become apparent as the following description proceeds particularly when reference is had to the accompanying drawings wherein.

Figure 1:
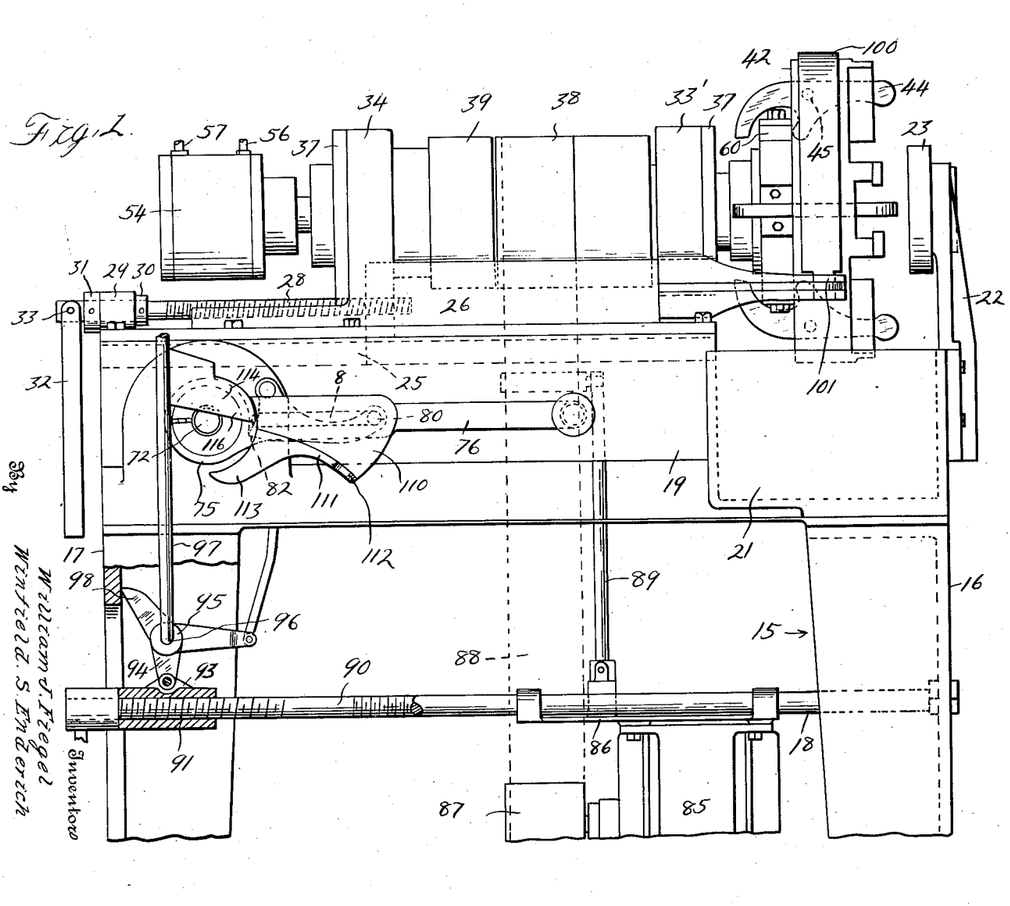
Figure 1 is a side elevational view with certain parts broken away of a machine constructed in accordance with the invention.
Figure 9:
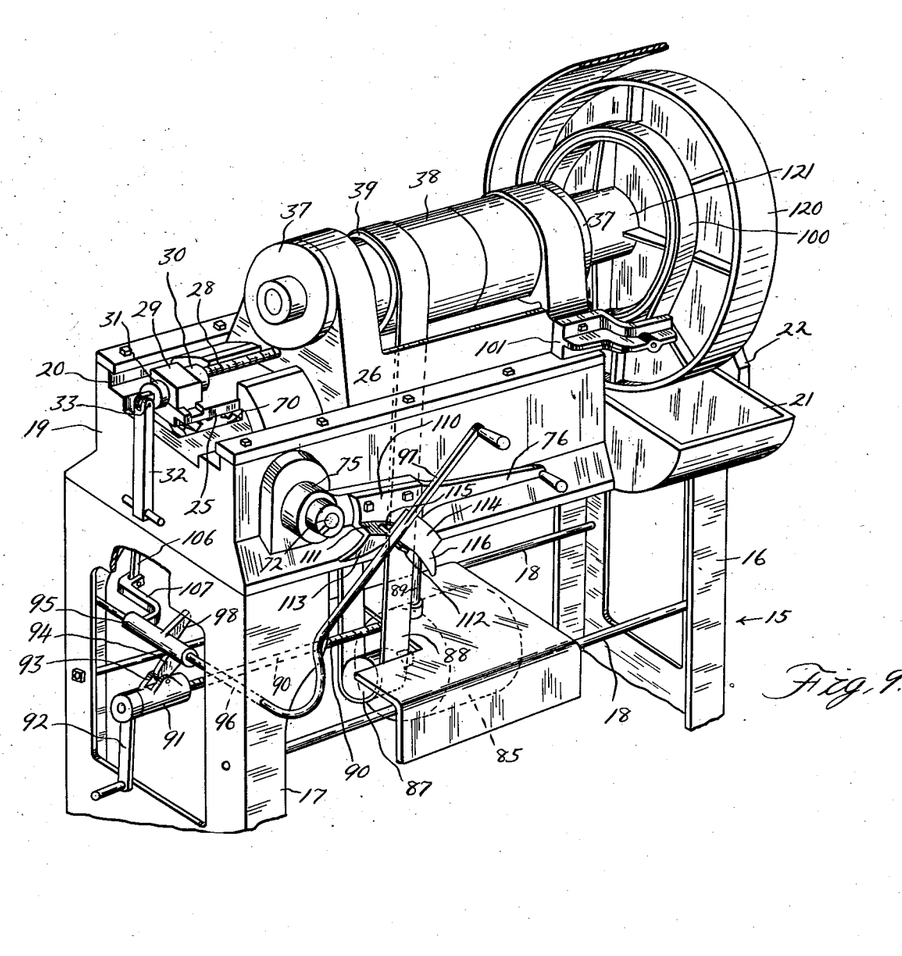
Figure 9 is a perspective view of the machine showing the same equipped with a slightly different form of head.

Referring now to the drawings wherein like reference characters designate corresponding parts throughout all views of the same and referring particularly to Figures 1 and 9, it will be noted that the machine includes a supporting frame 15 having the front and rear sections 16 and 17 respectively which sections are connected and braced by suitable tie rods 18. Supported on the frame 15 is a bed 19 having the guide ways 20 for receiving the carriage hereinafter to the described.

Arranged at the forward end of the bed 19 and above the front section 16 of the frame 15, is a trough like receptacle 21 to the front wall of which there is secured a standard 22 carrying at its upper free end a face plate 23. The face plate 23 is rotatably journalled in the end of the standard 22 and is provided centrally with a passage 24 through which babbitt may be discharged in a manner hereinafter to be more fully described.

Figure 2:
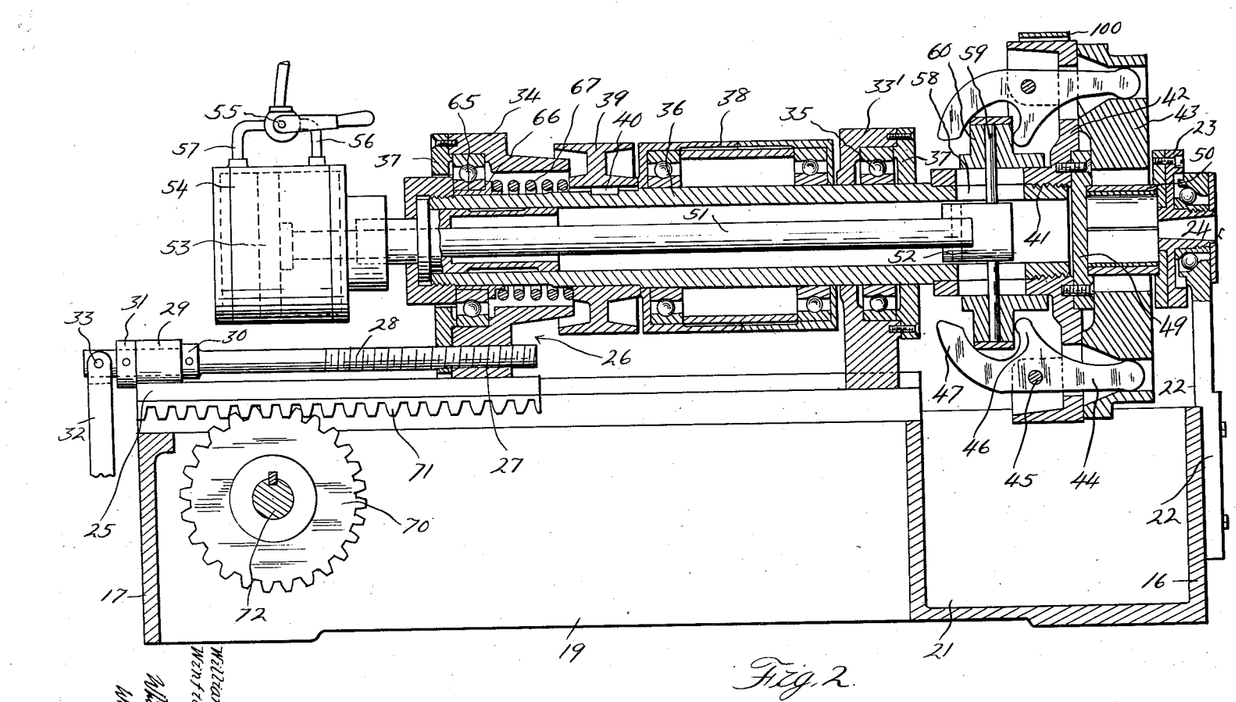
Figure 2 is a vertical longitudinal sectional view through the upper portion of the machine shown in Figure 1.

Slidably mounted in the guideways 20 for longitudinal movement relative to the bed 19 is a carriage 25. This carriage 25 is provided with suitable trackways for slidably receiving a second carriage 26, the second carriage being adjustable longitudinally of the first carriage 25. For effecting an adjustment of the second carriage 26 the rear portion of the second carriage 26 is provided with a threaded aperture 27 adapted to receive a threaded shaft 28 journalled in a bearing 29 carried by the carriage 25. A shoulder 30 formed on the shaft 28 cooperates with a lock washer 31 carried by the shaft to prevent movement of the shaft relative to the bearing 29. The free end of the shaft 28 is provided with a handle 32 and it is preferable to pivot this handle to the shaft 28 as at 33 so that when the handle is not in use, the same may be swung downwardly out of the way as clearly shown in Figures 2 and 9. Obviously rotation of the shaft 28 tends to move the carriage 26 longitudinally of the carriage 25 and effects an adjustment of the one carriage relative to the other.

The carriage 26 includes the front and rear uprights 33' and 34 respectively, these uprights being hollowed and being provided with bearings 35 to receive a drive shaft 36. As illustrated, cover plates 37 may be secured to the uprights 33' and 34 to form housings for the bearings 35.

The drive shaft 36 is provided intermediate the standards 33' and 34 with the idler pulley 38 and the driving pulley 39, the latter being secured to the shaft 36 in any desired manner as by a key 40. The idler pulley 38 is considerably wider than the driving pulley 39 for a purpose which will hereinafter be more fully described.

The forward end of the shaft 36 is threaded as at 41 for the reception of a head 42. The head 42 is in the nature of a chuck and is provided with the radially movable jaws 43 and the members 44 for effecting radial movement of the jaws 43. As clearly illustrated in Figure 2 of the drawing the members 44 are pivoted to the head 42 as by the pins 45 and are provided with spaced fingers 46 and 47 adapted to be engaged by a mechanism to be hereinafter described whereby they may be rocked about their pivots to effect the desired movement of the jaws 43. The head 42 is also provided on its outer face with a centrally arranged bearing plate 49 adapted when the carriages 25 and 26 are moved longitudinally of the bed 19 to clamp a bearing 50 against the rotatable face plate 23. The jaws 43 are arranged to move between the bearing plate 49 and face plate 23 so that when a bearing 50 is clamped between the plate 49 and face plate 23, the jaws 43 may be moved inwardly to engage the outer periphery of the bearing to firmly hold the same in position.

For effecting an actuation of the members 44, the shaft 36 is hollowed to receive a connecting rod 51 provided on its forward end with a head 52 and on its rear end with a piston 53. The piston 53 is reciprocable in a chamber 54 to the opposite ends of which fluid under pressure may be selectively introduced as by the valve 55 and conduits 56 and 57. Obviously introduction of a fluid into either end of the chamber 54 tends to move the piston 53 to the other end of the chamber and to reciprocate the connecting rod 51.

The shaft 36 and head 42 are slotted as at 58 to permit the longitudinal movement of the pins 59 carried by the head 52 of the connecting rod 51. The pins 59 carry at their outer ends, a member 60 adapted to engage the fingers 46 and 47 of the members 44. The member 60 is slidable on the head 42 whereby the same may be reciprocated with the shaft or connecting rod 51. Obviously longitudinal movement of the member 60 by the connecting rod 51 causes the same to engage either the fingers 46 or fingers 47 to swing the members 44 in the desired direction about their pivot pins 45 and to effect a correspondingly desired radial movement of the jaws 43. It will be apparent that the head 52 must rotate with the shaft 36, and to permit this rotation the rod 51 may be either rotatably connected to the head 52 or may be rotatably connected to the piston 53 within the cylinder 54. If desired, however, the piston 53 may be rotatably mounted within the cylinder 54 or the cylinder 54 may itself be mounted for rotation with the piston 53 and rod 51, in which event the air lines 56 and 57 will be so connected to the cylinder 54 as to permit rotation of the latter.

In operation, the carriage 25 is adapted to be moved a sufficient distance longitudinally of the bed 19 to cause the bearing plate 49 to clamp a bearing 50 against the face plate 23. It is desirable however, to always move the carriage 25 the same distance in order that means may be provided to wedge the carriage in its advanced position and to provide for this movement, means are provided for compensating for slight variations in the length of the bearings 50. This means includes a sleeve 65 surrounding the shaft 36 and carried by the rear bearing 35. The sleeve 65 is provided with a radially extending flange 66 adapted to form a bearing for one end of a spring 67, the opposite end of this spring being adapted to bear against the driving pulley 39 keyed to the shaft 36. The spring 67 bearing as it does against the bearing 35 through the sleeve 66, tends to urge the shaft 36 longitudinally of the carriage 26 and urges the head 42 and the bearing plate 49 into firm engagement with the end of the bearing 50. It is obvious therefore that regardless of slight variations in the length of the bearings 50 the carriage 25 may be moved a predetermined desired amount and the spring 67 will cause the abutment plate to firmly engage the end of the bearing 50.

Figure 6:
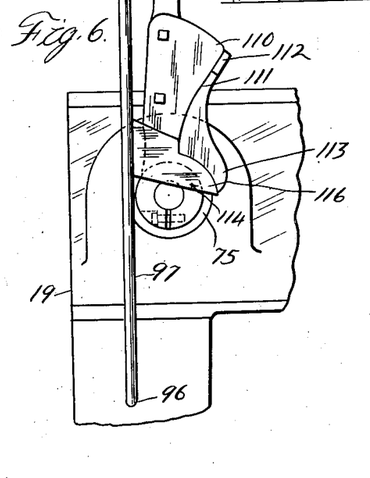
Figure 6 is a fragmentary detail elevational view of a portion of the machine.

For moving the carriage 25 longitudinally of the bed 19 there is provided a gear 70 adapted to mesh with a rack 71 formed on the under surface of the carriage 25. The gear 70 is rigidly mounted on a shaft 72 journalled in bearings 73 carried by the bed 19. The shaft 72 projects on opposite sides beyond the bed 19 and is provided on one of its ends with a curved roller 74 for a purpose hereinafter to be described. To the other end of the shaft 72 there is secured the hub 75 of a lever 76. The lever is so arranged that when the same is in a substantially horizontal position as shown in Figure 9 of the drawing, the carriage 25 will be advanced to a position where the head 42 will clamp the bearing 50. Obviously when the lever 76 is in its vertical position as shown in Figure 6 of the drawing, the carriage 25 will be moved rearwardly so that the bearing 50 may be readily removed.

Figure 5:
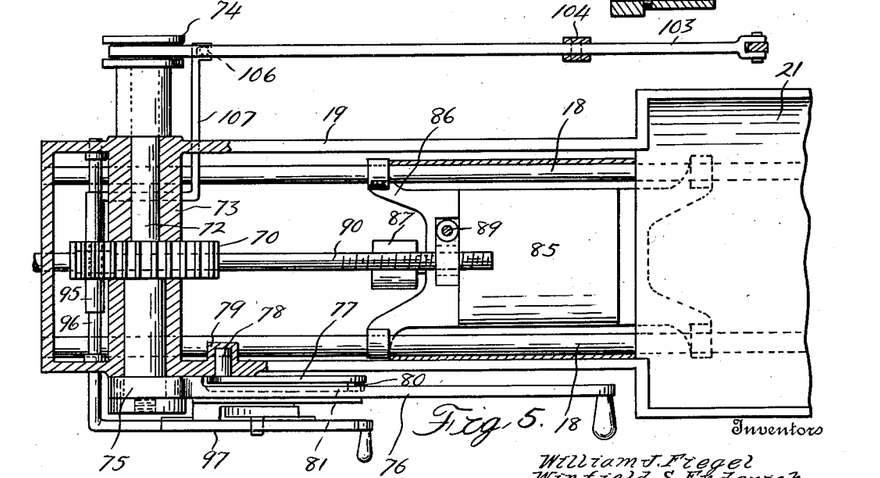
Figure 5 is a longitudinal horizontal sectional view through the machine.
Figure 8:
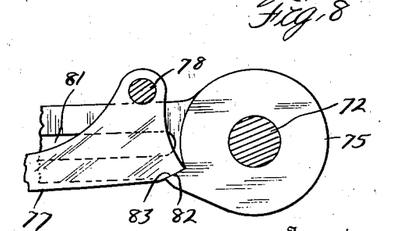
Figure 8 is a detail sectional view of a portion of the structure shown in Figure 7.

As brought out before, it is desirable to effect a wedging of the carriage in its forward or advanced position. To accomplish this, means are provided for wedging the lever 76 in its horizontal position. This means includes a bell crank shaped arm 77 having one end pivoted to the bed 19 adjacent the hub 75 as by a pin 78 journalled in a bearing 79 carried by the bed 19. The other end of the arm 77 is provided with a pin 80 adapted to be slidably received in a slot 81 arranged on the inner face of the lever 76. The angle of the arm 77 is provided with a cam surface 82 adapted to engage a shoulder 83 formed on the hub 75 when the arm 76 is in its horizontal position. This structure is clearly shown in Figures 5, 7 and 8 of the drawing and it will readily be seen that when the lever 76 is moved to its horizontal position to move the carriage 25 to a position where the head 42 will clamp the work, the cam 82 will engage the shoulder 83 with a wedging action to hold the lever in this position. When however, the lever 76 is moved to the dotted line position shown in Figure 7, the arm 77, being pivoted at a point spaced from the hub 75, will move in such a manner as to disengage the cam surface 82 from the shoulder 83 to permit movement of the hub 75.

For driving the head 42 there is provided a motor 85. This motor is slidably mounted on the tie rods 18 as by the arms 86 for longitudinal movement relative to the frame 15. The motor 85 is provided with a drive pulley 87 adapted to be connected to either the idler pulley 38 or the driving pulley 39 by a belt 88. If desired, a suitable guide 89 may be mounted for movement with the motor 85 to guide the belt 88 in its movement from one pulley to the other. Obviously movement of the motor 85 longitudinally of the frame 15, will cause the belt 88 to move relative to the pulleys 38 and 39. When the belt 88 engages the driving pulleys 39, the head 42 will be rotated and the motor will be in driving position. When however, the motor 85 is moved so that the belt 88 engages the idler pulley 38, no rotation will be transmitted to the head 42 and the motor will be in its idle position.

For moving the motor 85 longitudinally of the frame 15 there is provided an arm 90 secured at its forward end to the motor 85 and adapted to threadedly engage a sleeve 91 arranged adjacent its rear end. The shaft 90 may be provided at its rear extremity with a handle 92 whereby the shaft may be rotated to vary the adjustment of the sleeve 91 relative to the motor 85. Obviously by virtue of the threaded engagement of the sleeve 91 with the shaft 90, rotation of the shaft 90 will tend to move the shaft 90 longitudinally of the sleeve to longitudinally adjust the motor.

The sleeve 91 is provided with the upstanding ears 93 adapted to pivotally receive the free end of the arm 94 carried by a sleeve 95 secured to a transversely extending rod 96 journalled in the rear portion 17 of the frame 15. The rod 96 is bent at its outer end to form a lever 97 by which the rod 96 may be rotated. The sleeve 95 is further provided with an arm 98 projecting at a point substantially diametrically opposite the arm 94 and this arm 98 is adapted to engage the inner face of the end 17 of the frame 15 to form a stop for the rotation of the rod 96. When the lever 97 is in the position shown in Figure 9 of the drawing, the motor is in a position to drive the head 42 through the belt 88 and drive pulley 39. When however, it is desired to disconnect the motor from the head 42 the lever 97 is pulled backwardly to a substantially vertical position as shown in Figure 1 of the drawing whereupon the motor is shifted forwardly so that the belt 88 engages the idler pulley 38. As clearly illustrated in Figure 1 of the drawing, the arm 98 engages the end 17 of the frame 15 to limit the swing of the lever 97 to a vertical position.

Figures 3, 7:
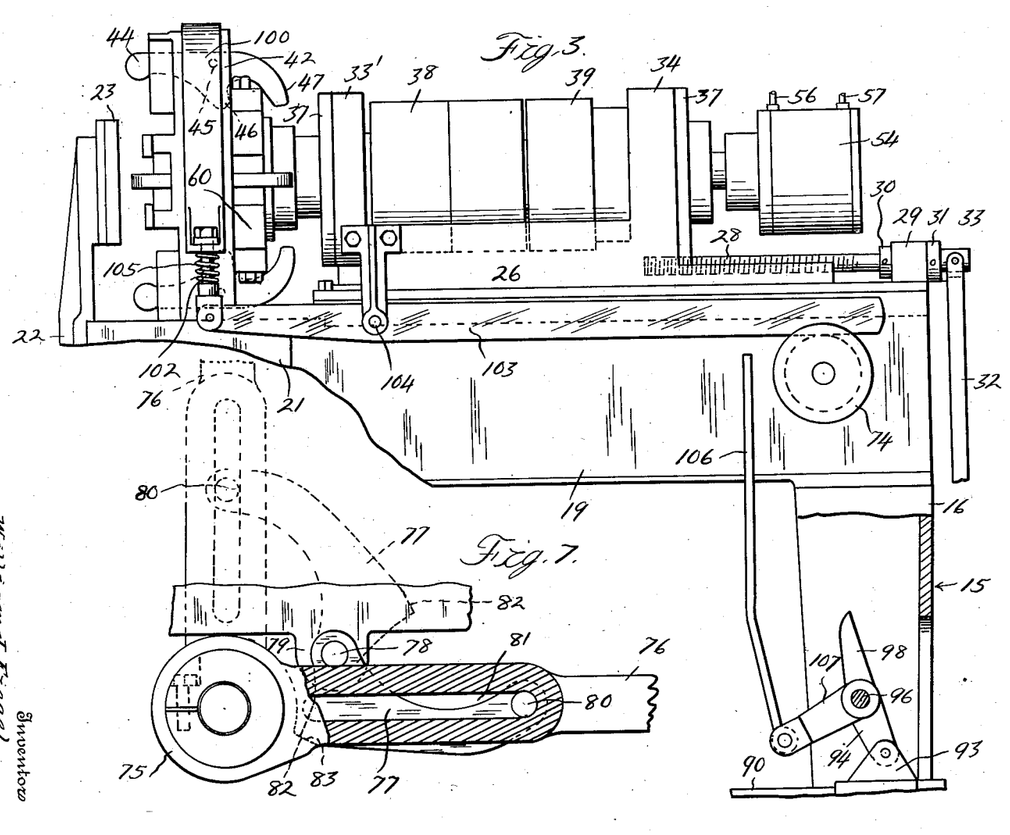
Figure 3 is a fragmentary side elevational view of the machine showing the side opposite that shown in Figure 1.
Figure 7 is a fragmentary view partly in section showing certain details of construction.
Figure 4:
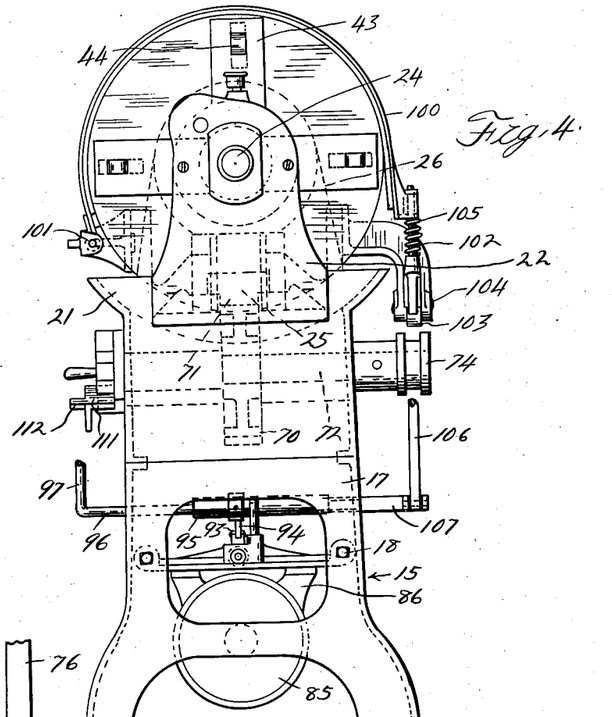
Figure 4 is an end elevational view of the machine.

It is also a feature of this invention to provide means for applying a brake to the rotatable head when the motor 85 is shifted to its idle position. To accomplish this, there is provided as illustrated in Figures 1 and 3 of the drawing, a brake band 100 adapted to engage a portion of the head 42. One end of this brake band is rigidly secured to a bracket 101 carried by the carriage 26, while the other end of the brake band is secured as by the bolt 102 to the free end of an arm 103 pivoted to the carriage 25 as at 104. The free end of the arm 103 is adapted to normally rest in the groove of the roller 74 carried by the shaft 72 and a spring 105 surrounding the bolt 102 tends to release the brake band 100 when the arm 103 is in its position of rest on the roller 74. For moving the arm 103 about its pivot 104 and to subsequently draw the brake band 100 into firm engagement with the head 42 there is provided an arm 106 secured at its lower end to an arm 107 rigidly secured to the sleeve 95. This mechanism is so arranged that when the lever 97 is in the position shown in Figure 9 of the drawing and the motor 85 is driving the rotatable head, the arm 106 will be held in spaced relation to the end of the arm 103. When however, the lever 97 is moved to its vertical position to shift the motor to idle position, the arm 107 is moved upwardly to cause the arm 106 to engage the arm 103 whereby the arm 103 is rocked about its pivot 104 and the brake band 100 is tightened about the rotatable head 42. It will thus be seen that upon the shifting of the motor 85 to idle position, the rotation of the head 42 wil be immediately stopped by the application of a braking force.

In the operation of the machine, the head 42 is adapted to be rotated at an extremely high speed to impart a corresponding rotation to the bearing 50. Accordingly it is essential that the bearing 50 be firmly clamped in position during the rotation of the head 42. Accordingly this invention contemplates the provision of means whereby when the motor 85 is connected to the head 42 to rotate the same, the head 42 cannot be moved to a position to release the bearing 50 and, conversely means whereby when the head 42 is in a position to release the bearing 50 the motor 85 may not be moved to a position to rotate the head.

To accomplish this purpose, there is provided a plate 110 secured to the outer face of the lever 76. This plate 110 is provided with a laterally extending slightly curved flange 111 from one end of the edge of which extends a projection 112. The other end of the edge of the flange 111 is turned downwardly to provide a finger like projection 113. Carried by the lever 97 is an angle plate 114, which plate is provided with a portion 115 adapted to ride on the flange 111 of the plate 110 when the levers are in the position shown in Figure 9 of the drawing, and with a curved extension 116 adapted to be engaged by the finger 113 when the levers are in the position shown in Figure 6 of the drawing. By reference to Figures 1, 6 and 9, it will be noted that when the levers are in the position shown in Figure 9 of the drawing, the lever 76 is prevented from being swung to its vertical position by virtue of the engagement of the flange 115 with the flange 111. In order therefore to move the lever 76 it is necessary to first move the lever 97 so that the flange 115 is moved out of the path of travel of the flange 111. When however, the lever 97 is moved to a vertical position the lever 76 may then also be moved to a vertical position since as shown in Figure 1 of the drawing the plates 110 and 114 are out of the path of travel of each other. When however both levers are in their vertical position as shown in Figure 6 of the drawing, it is impossible to move the lever 97 to a horizontal position in advance of the movement of the lever 76 by virtue of the engagement of the finger 113 of the plate 110 with the extension 116 of the plate 114. The projection 112 serves as a stop for the lever 97 to limit movement of the motor 85.

By virtue of the plates 110 and 114 it will be obvious that when both of the levers are in the position shown in Figure 9 of the drawing and the head 42 is in clamping position and the motor 85 in driving position, the lever 76 may not be moved to move the head 42 to releasing position until the lever 97 is first moved to move the motor to idle position and to apply the brake. Similarly when the levers are in the position shown in Figure 6 with the motor in idle position and the head in work releasing position, the lever 97 may not be moved to move the motor to driving position until the lever 76 is first moved to move the head to work clamping position.

Figure 10:
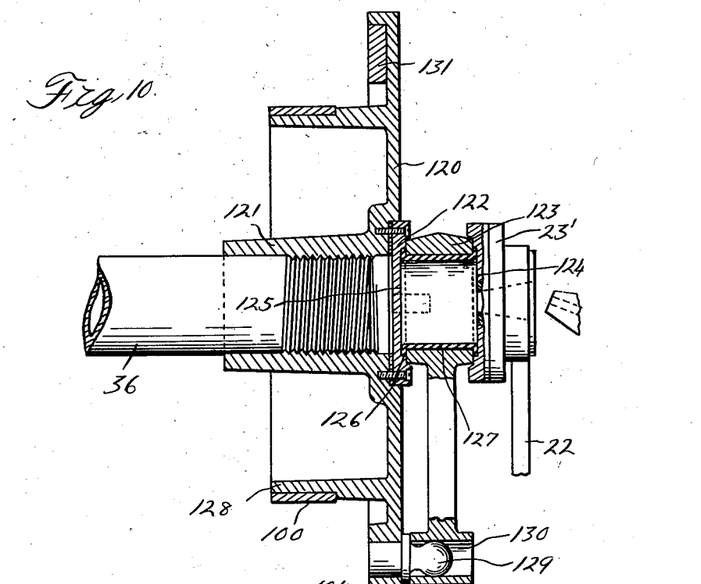
Figure 10 is a detail sectional view of the head shown mounted on the machine in Figure 9.

In Figures 9 and 10 I have shown a slightly modified form of head for threaded engagement with the end of the shaft 36. This head 120 has a hub 121 internally threaded for engagement with the shaft 36 and is provided with the abutment plate 122 adapted to clamp a connecting rod 123 against the face plate 23'. In this form of construction the face plate 23' and the abutment plate 122 are provided with countersunk portions 124 and 125 respectively to form flanges 126 on the babbitt lining 127.

The head 120 is further provided with an annular drum portion 128 adapted for engagement by the brake band 100 and is provided on its face with a pin 129 adapted to engage the bearing 130 of the connecting rod 123. To balance the rotation of the head 120 a counterweight 131 may be mounted at a point diametrically opposite the pin 129. While in the other form of head the bearing 50 is adapted to be clamped between the face plate 23 and abutment plate 49 and is adapted to have its periphery clamped by the jaws 43, in this form of head the connecting rod 123 is adapted to be merely clamped between the face plate 23' and the abutment plate 122.

In both forms of construction the bearing or connecting rod is adapted to be clamped in position and rapidly rotated, while a quantity of Babbitt or other suitable metal is discharged into the interior of the bearing or connecting rod through the passage 24 in the face plate 23. The rapid rotation of the bearing or connecting rod causes the liquid metal to be centrifugally deposited on the inner periphery of the bearing or connecting rod to effect a complete covering of the same.

From the above it will be apparent that I have provided a babbitting machine including a rotatable head adapted to clamp a bearing or connecting rod to be coated with babbitt; means urging the head into engagement with the bearing or connecting rod to compensate for variations in the length of the same, a motor movable to drive the rotatable head; a brake actuated by the movement of the motor; means for wedging the carriage which supports the head in work clamping position; and means for absolutely preventing a releasing of the work during rotation of the same.

While the invention has been described particularly with relation to a babbitting machine, it is obvious that the inventive principles disclosed may be incorporated in a machine of any similar character wherein it is desired to line the interior of any article with a metal or other substance in a liquid or molten state. It is to be understood therefore that the description is not definitive of the limits of the inventive idea and that the right is reserved to make such changes in the details of construction and the arrangement of parts as will fall within the purview of the attached claims.

What we claim as our invention is:

1. In a machine of the character described, a supporting frame, a bed carried by said supporting frame, a motor slidably mounted on the frame for longitudinal movement thereon, a carriage on the said bed, a drive shaft mounted on the carriage, driving and idle pulleys on the drive shaft, a head mounted on the drive shaft, a belt extending from the motor to the pulleys, and means for moving the motor to selectively engage the belt with either the driving or idle pulley.

2. In combination, a rotatable head, a motor for driving said head, said motor being movable to driving and idle positions, a lever for moving said motor, a brake band loosely surrounding said rotatable head, and means for tightening said brake band about the said head to brake the same upon the actuation of said lever to move said motor to idle position.

3. In combination, a rotatable head, a motor for driving said head, said motor being movable to driving and idle positions, a lever for moving said motor, a brake band for said rotatable head, a pivoted arm for tightening said brake band about said head to brake the same, and means operable to actuate said arm to tighten said brake band upon the actuation of said lever to move said motor to idle position.

4. In a machine of the character described, a face plate, a carriage movable toward and away from said face plate, means for adjustably moving said carriage toward or away from said face plate, additional means for moving said carriage toward or away from said face plate, a drive shaft mounted on said carriage, a head on said drive shaft, and a spring sleeved on said shaft for resiliently urging said head toward said face plate.

5. In a machine of the character described, a face plate, a carriage movable toward and away from said face plate, means for moving said carriage to cause said head to clamp a work piece against said face plate, a head on said carriage, and means urging said head toward said face plate.

6. In a machine of the character described, a face plate, a carriage movable toward and away from said face plate, a drive shaft mounted on said carriage, a head on said drive shaft, and means yieldably urging said drive shaft and head toward said carriage.

7. In a machine of the character described, a face plate, a carriage, a head on said carriage, a lever for moving said carriage to cause the head to clamp a piece of work against the face plate, and means for wedging said lever in a position to maintain said head in work clamping position.

8. In a machine of the character described, a face plate, a carriage, a head on said carriage, a lever for moving said carriage to cause the head to clamp a piece of work against the face plate, and means for wedging said lever in a position to maintain said head in work clamping position, said means including an arm pivotally mounted adjacent said lever, and a pin carried by said arm and slidably engaging said lever.

9. In a machine of the character described, a face plate, a carriage, a head on said carriage, a lever for moving said carriage to cause the head to clamp a piece of work against the face plate, and means for wedging said lever in a position to maintain said head in work clamping position, said means including an arm slidably connected to said lever, the said arm having a portion wedgingly engaging the hub of the lever.

10. In combination, a member movable to work clamping and work releasing positions, a motor, means for connecting said motor to said member to rotate the same, and means preventing connection of said motor to said member when said member is in work releasing position.

11. In combination a member movable to work clamping and work releasing positions, a motor, means for connecting said motor to said member to rotate the same, and means preventing movement of said member to work releasing position when said motor is connected to the same.

12. In combination, a head movable to work clamping and work releasing positions, a motor for rotating said head, said motor being movable to driving and idle positions, and means operable when said head is in work releasing position to prevent movement of said motor to driving position.

13. In combination, a head movable to work clamping and work releasing positions, a motor for rotating said head, said motor being movable to driving and idle positions, and means operable when said motor is in driving position to prevent movement of said head to work releasing positions.

14. In combination, a head movable to work clamping and work releasing positions, a motor for rotating said head, said motor being movable to driving and idle positions, levers for moving said head and motor, and means carried by said levers for preventing movement of said head to work releasing position when the motor is in driving position and movement of said motor to driving position when said head is in work releasing position.

15. In combination, a head movable to work clamping and work releasing positions, a lever for moving said head, a source of power for rotating said head, a lever movable to connect the source of power to said head or to disconnect the source of power from said head, and means carried by said lever for preventing movement of said head to work releasing position when the source of power is connected to the head and to prevent connection of the source of power to the head when the latter is in work releasing position.

16. In combination, a head movable to work clamping and work releasing positions, a lever for moving said head, a source of power for rotating said head, a lever movable to connect the source of power to said head or to disconnect the source of power from said head, and means carried by said lever for preventing movement of said head to work releasing position when the source of power is connected to the head and to prevent connection of the source of power to the head when the latter is in work releasing position, said means including a pair of plates forming abutments for said levers and preventing movement of said levers except in a predetermined desired sequence.

17. In combination, a head movable to a position to clamp a piece of work, means for rotating said head and means preventing a coupling of said rotating means to the said head until the head is in its clamping position.

18. In combination, a carriage, a head mounted on the carriage, a face plate, means for moving the carriage and head to a point adjacent the face plate, a motor for rotating the head, means for coupling the motor to the head to rotate the same and means preventing actuation of the said coupling means except when the head is in its position adjacent the face plate.

19. In combination a face plate, a head movable to a position adjacent the face plate to clamp a piece of work against the same, a lever for moving the head, means for rotating the head, and means preventing movement of said lever during the rotation of said head by said rotating means.

20. In combination a head movable to work clamping and work releasing positions, a motor for rotating said head, said motor being movable to driving and idle positions, levers for moving said head and motor, and means preventing movement of said levers except in a predetermined desired sequence.

21. In combination, a head movable to work clamping and work releasing positions, a motor for rotating said head, said motor being movable to driving and idle positions, a lever for moving said head, a second lever for moving said motor, and means carried by said levers for preventing the actuation of said levers except in a predetermined desired sequence.

22. In a machine of the character described, a rotatable shaft, driving and idle pulleys on the said shaft, a motor, a belt extending from the motor to the pulleys, and means for moving the motor to selectively engage the belt with either the driving or idle pulley.

23. In combination a head adapted to clamp a piece of work, a lever for actuating said head to cause the same to clamp or release the piece of work, a motor for rotating said head, a lever for effecting a coupling of the motor to the head, and means preventing movement of said levers except in a predetermined desired sequence.

24. In combination a head movable to work clamping and work releasing positions, means for moving said head to either of said positions, a motor for rotating said head, means for effecting a coupling of said motor to said head, and means preventing actuation of said head moving means and said coupling means except in a predetermined desired sequence.

25. In combination, a rotatable head, a source of power for rotating said head, a lever movable to connect the source of power to said head or to disconnect the source of power from said head, a brake-band for said rotatable head, and means for tightening said brake-band about said head to brake the same upon movement of said lever to a position to disconnect the source of power from said head, said means including a pivoted arm for actuating said brake-band, and a link carried by said lever and abuttingly engageable with said arm to move the same about its pivot upon a predetermined movement of said lever.

26. In a machine of the character described, a face-plate, a carriage, a head on said carriage, a lever for moving said carriage to cause the head to clamp a piece of work against the face-plate, and means for wedging said lever in a position to maintain said head in work-clamping position, said means including a substantially bell-crank shaped arm pivotally mounted adjacent the hub of said lever, and a pin connecting one end of said arm to said lever, said arm being provided with a cam surface engageable with a shoulder formed on the hub of said lever.

27. In combination, a head movable to work-clamping and work-releasing positions, a lever for moving said head, a source of power for rotating said head, a lever movable to connect the source of power to said head or to disconnect the source of power from said head, and means carried by said levers for preventing movement of said head to work-releasing position when the source of power is connected to the head and to prevent connection of the source of power to the head when the latter is in work-releasing position, said means including a plate carried by the first mentioned lever, said plate having a laterally extending curved flange provided at its one end with a lateral extension and at its other end with a downwardly turned projection, and a second plate carried by the other of said levers, said second mentioned plate having a portion adapted to engage the curved flange on said first mentioned plate and having an extended portion adapted to engage the down-turned projection on the first mentioned plate.

In testimony whereof we affix our signatures.

WILLIAM J. FIEGEL.
WINFIELD S. ENDERICH.